United States Patent [19]

Poncy

[11] Patent Number: 4,771,954
[45] Date of Patent: Sep. 20, 1988

[54] WOODEN PEPPERMILL TREE

[76] Inventor: George W. Poncy, 3725 Investment La., Riviera Beach, Fla. 33404

[21] Appl. No.: 104,384

[22] Filed: Oct. 5, 1987

[51] Int. Cl.$^4$ ............................................. A47J 42/04
[52] U.S. Cl. ................................ 241/169.1; 241/285 R
[58] Field of Search ............................ 222/142.1–142.9; 241/168, 169.1, 169, 169.2, 285 R, 257 R, 258

[56] References Cited

U.S. PATENT DOCUMENTS 3,633,834  1/1972  Nissen ................................ 241/169.1
3,991,947  11/1976  Schlessel ............................ 241/169.1

Primary Examiner—Mark Rosenbaum
Attorney, Agent, or Firm—Lane and Aitken

[57] ABSTRACT

In a peppermill having a disposable pepper grinding cartridge which contains the peppercorns to be ground as well as the grinding mechanism for grinding the peppercorns and dispensing the ground pepper. A wooden casing surrounds the disposable cartridge. A wooden handle portion connects with the rotatable part of the disposable cartridge. A plastic adaptor is mounted on the lower end of the wooden handle portion. The plastic adaptor has a dove-tailed shaped bar which slides in a dove-tailed shaped groove defined in the rotatable cap of the disposable cartridge. A plastic adaptor fits over the lower end of the wooden casing to define slots to receive lugs formed on the disposable cartridge to prevent the cartridge from rotating relative to the wooden casing.

12 Claims, 2 Drawing Sheets

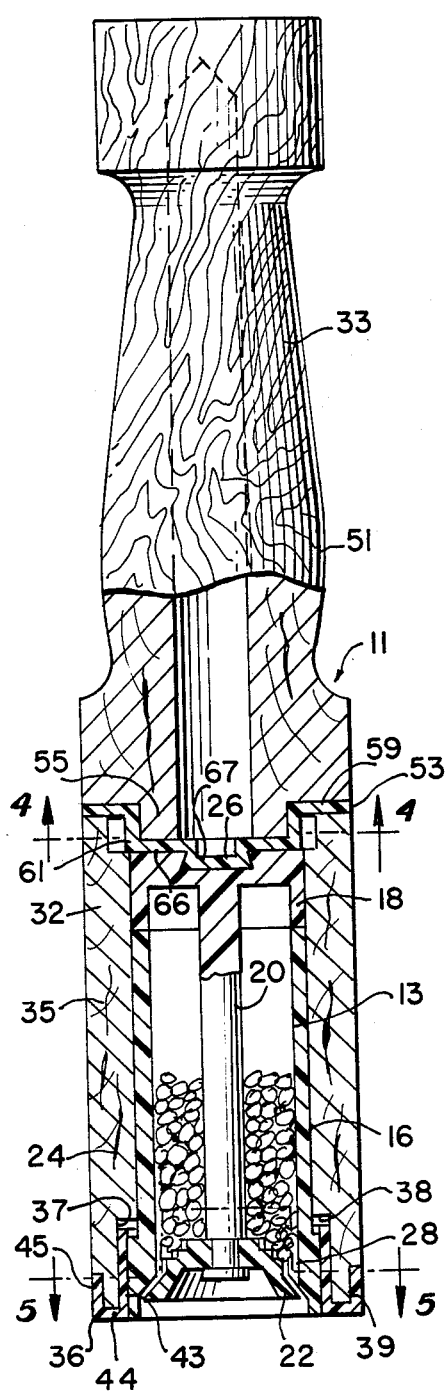
FIG. 1.
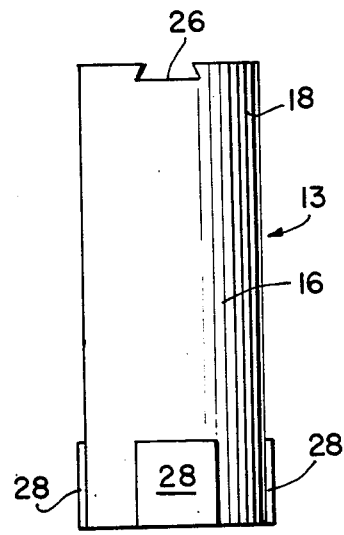
FIG. 3.
FIG. 2.
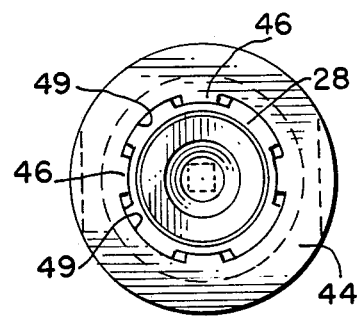
FIG. 4.
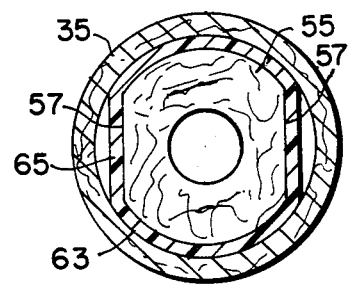

WOODEN PEPPERMILL TREE

This invention relates to food grinders and more particularly to a wooden peppermill having a disposable cartridge for containing and grinding peppercorns.

BACKGROUND OF THE INVENTION

Conventional peppermills have the disadvantage in that they are difficult to refill. In addition, their grinding surfaces tend to become clogged impairing their performance unless and until the grinding surfaces are cleaned. Cleaning of the peppermill requires disassembly and reassembly of the peppermill, which are difficult tasks. Moreover, after a period of use, the grinding surfaces become worn requiring replacement of the entire peppermill even though this is the only portion of the peppermill which has deteriorated to any degree.

To overcome these problems, as disclosed in the copending application Ser. No. 088,254 invented by the inventor of this application and filed on Aug. 24, 1987, it was proposed to provide a peppermill "tree", which is a term used in this application meaning a permanent outer casing designed to hold and contain a disposable pepper-grinding cartridge. The cartridge contains the peppercorns to be ground and also is provided with grinding surfaces, which when the peppermill tree is operated will grind the peppercorns and dispense them from the bottom of the peppermill tree on the food to be seasoned. When all of the peppercorns in the cartridge have been ground and dispensed from the cartridge, the cartridge is simply replaced with a new cartridge with fresh peppercorns and with new grinding surfaces. Because the cartridge is designed in a manner to make it inexpensive, the cartridge can be provided for about the same cost that peppercorns in their containers are presently being sold. The peppermill tree of the above-identified copending application is made of molded plastic. "Plastic" as used in this application means "synthetic resin". To provide peppermills of different sizes, extension members are provided to increase the length of the peppermill to the desired size with the size being determined by the number of extension members used. The length of the peppermill is varied by means of extensions instead of molding different sizes to avoid the cost of the different molds which would otherwise be required for the different sizes of peppermills.

SUMMARY OF THE INVENTION

In accordance with the present invention, instead of making the peppermill tree out of molded plastic, the peppermill tree is made largely out of wood, which can be configured in any desired shape or size without the need of molds. Moreover, the use of wood for the peppermill tree makes it possible to use the natural beauty of wood in the design appearance of the peppermill. When the peppermill tree is made out of wood, the coaction between the peppermill tree and the cartridge as described in the above-identified application must still be provided. The disposable cartridge is essentially the same as described in the above-identified application Ser. No. 088,254. The cartridge has a cylindrical shape and includes a body having an interior grinding surface and a cap rotatable relative to the body. The cap is connected to a member defining the bottom of the cartridge having grinding surfaces cooperating with interior grinding surfaces on the cartridge body so that rotation of the cap relative to the body causes the grinding of the peppercorns and dispensing of the ground pepper. The body has radially projecting legs which are received in blind slots defined in the interior surface of the lower tubular section of the peppermill tree. The lower tubular section is referred to as the "trunk" of the peppermill tree. The peppermill tree includes an upper section, referred to as the "stem", having a dove-tail shaped bar formed on the lower end thereof. The dove-tail shaped bar slides into a dove-tail shaped slot in the cap of the cartridge. As stated above, the peppermill tree is primarily made out of wood. However to define the blind slots defined in the lower interior surface of the trunk and to define the dove-tail shaped bar, adapters made of hard plastic are provided. A plastic adaptor fits over the lower end of a wooden tubular portion of the body to define the blind slots. A second adaptor made of plastic fits on the bottom of a wooden portion of the stem of and slides into the corresponding dove-tailed slot in the cap of the cartridge. By making these adapters out of hard plastic instead of defining them in the wood of the peppermill tree, the peppermill tree can be manufactured with a lot less waste. When the intricate shapes such as the dove-tailed bar or the blind slots are attempted to be formed from a wooden blank, there is a tendency for the wood to splinter and when splintering occurs, the blank has to be discarded. Because the peppermill tree is made out of wood except for the adapters, the tree can be made of any desired length and of substantially any desired shape and different lengths and different shapes for the peppermill tree are readily provided.

Accordingly, an object of the present invention is to provide an improved food grinder for holding a disposable cartridge for containing and grinding food.

A further object of the present invention is to provide an improved peppermill tree for holding and operating a disposable cartridge for containing and grinding peppercorns.

A further object of the present invention is to provide a peppermill tree made largely of wood.

A further object of the present invention is to reduce the waste in the manufacture of wooden peppermill trees.

Further objects and advantages of the present invention will become readily apparent as the following detailed description of the preferred embodiment unfolds and when taken in conjunction with the drawings.

BRIEF DESCRIPTION OF THE DRAWINGS

FIG. 1 is a view in elevation of the peppermill of the invention shown in partial axial section;

FIG. 2 is a bottom plan view of the peppermill of FIG. 1;

FIG. 3 is a view in elevation of the disposable cartridge employed in the peppermill of FIG. 1;

FIG. 4 is a cross sectional view of the peppermill of the invention taken along the line 4—4 of FIG. 1;

As shown in FIG. 1, the peppermill of the present invention comprises a peppermill tree 11, and a disposable cartridge 13, which serves to contain peppercorns to be ground as well as function to grind the peppercorns and dispense the ground pepper from the peppermill. The disposable peppermill cartridge is similar that disclosed in applicant's copending application, Ser. No. 038,648, filed Apr. 15, 1987. The cartridge comprises a tubular body 16 having open ends and having grinding surfaces on the interior wall surface of the body 16 at one end thereof. Because of the need for rigid grinding surfaces in the cartridge 13, the cartridge is preferably made from tough hard plastic such as polycarbonate. A cap 18 is positioned at one end of the tubular body 16 for rotation relative to the body and includes a depending shaft 20 connected to a grinding male element 22, which closes the end of the body 16 having the grinding surfaces, so that the male grinding element at one end and the cap at the other end will contain a supply of peppercorns 24 within the cartridge. Rotation of the cap 18 relative to the body 16 causes rotation of the grinding element 22 relative to the grinding surfaces on the interior wall of the body 16 so that the peppercorns 24 will be ground and the ground pepper will be dispensed from the bottom of the cartridge. The structure and operation of the grinding portions of the cartridge 13 are the same as the corresponding portions of the disposable peppermill disclosed in the above mentioned copending application Ser. No. 038,648.

As in copending application Ser. No. 088,254, the cap 18 has defined across the top thereof, an open ended groove 26, which is dovetail-shaped in cross section. Also as in the copending application Ser. No. 088,254, a plurality of lugs 28 project radially from the lower end of the cartridge body 16, where the grinding surfaces are formed as shown in FIG. 2.

Figure 6:
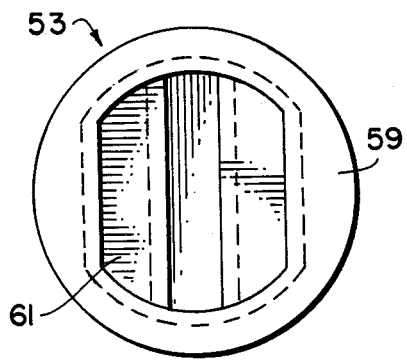
FIG. 6 is a cross sectional view of the peppermill taken along lines 6—6 of FIG. 1.

The peppermill tree has a lower trunk 32 as shown in FIG. 1 made primarily of wood and upper stem 33 also made primarily of wood. The lower trunk 32 is in the form of a hollow cylinder having open ends. The trunk 32 comprises a wooden cylindrical tubular body 35 and an adaptor 36 fitted on the lower end of the body 35. The wooden body 35 has a section 37 at the lower end with an enlarged internal diameter, which defines an internal shoulder 38. In addition, flats 39 are formed on diametrically opposite sides of the outside surface of the lower end of the cylindrical body 35. The adaptor 36 is made of a hard plastic such as polycarbonate and fits within the lower end of the cylindrical body 35. The adaptor 36 comprises an inner cylindrical tubular section 43 which fits with the enlarged diameter section 37 of the body 35 and a radial section 44 which abuts against the lower axial end surface of the body 35. On the outer edges of the radial section 44 are upstanding legs 45 which fit into the flats 39. As best shown in FIG. 6 the outer radial surfaces of the legs 45 are cylindrical and form a continuation of the outer cylindrical surface of the body 35.

Figure 5:
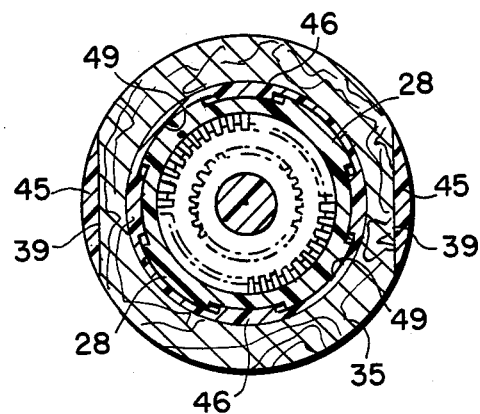
FIG. 5 is a top plan view of an adaptor employed to connect a handle portion of the peppermill to the rotary portion of the disposable cartridge employed in the peppermill of FIG. 1.

The inner cylindrical surface of the tubular section 43 is provided with ribs 46 extending axially inward and positioned at 90 degree intervals. Each rib 46 extends over an angle of about 30 degrees. The inner surfaces of the ribs 47 are cylindrical and form a continuation of the inner cylindrical surface of the upper portion of the body 35. The spaces 49 between the ribs 46 define blind slots in the bottom of the trunk 32. The blind slots extend up to the shoulder 38 defined by the upper end of the enlarged diameter section 37. These blind slots each extend over angles of 60 degrees and are distributed at 90 degree intervals. The blind slots 49 receive the radially extending lugs 28 on the cartridge body when the cartridge is inserted into the trunk 32 and prevent the cartridge from rotating relative to the trunk 32. The lugs 28 extend over angles of 45 degrees so they fit loosely within the blind slots 49 to facilitate insertion of the cartridge into the trunk 32. The stem 33 comprises a wooden handle portion 51 and an adaptor 53 at the lower end of the stem. The handle portion 51 has a reduced diameter cylindrical extension 55 which has flats 57 formed on the opposite cylindrical sides thereof as shown in FIG. 4. The adaptor 53 has a radial outer section 59 which abuts against a lower radial and face of the handle portion 51, as shown in FIGS. 1 and 5, and a center section 61 which is shaped to fit over the cylindrical wooden extension 55 and covering the lower surface of the extension 55, as shown in FIGS. 1 and 4. The center section 61 has cylindrical sidewalls 63 with flats 65 to correspond in shape to the extension 55 of the handle portion 51 and it also has a radial wall 66 covering the bottom of the extension 55. The cylindrical walls 63 of the center section are sized to and fit within the upper end of the cylindrical bore in the trunk 32. Extending across the radial bottom wall 66 of the center section 61 of the adaptor 53 is a dove-tailed shaped downwardly projecting bar 67, which is shaped to fit within the dove-tailed shaped groove 26 in the cap of the cartridge.

Figure 7:
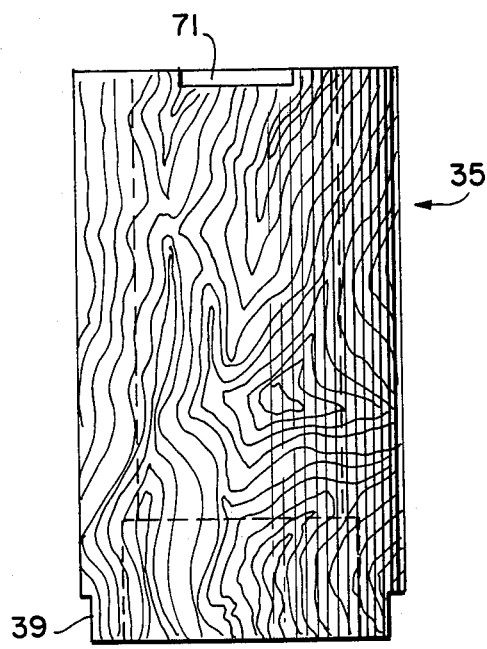
FIG. 7 is a view and elevation of the lower wooden part of the outer casing of the peppermill shown in FIG. 1.
Figure 8:
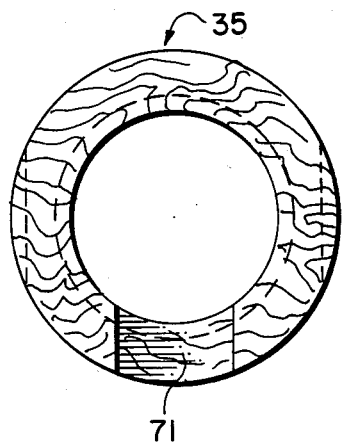
FIG. 8 is a top plan view of the part shown in FIG. 7.

At the top of the trunk 32 a cut out 71 is provided extending through the wall of the trunk to the cylindrical bore of the trunk as shown in FIGS. 7 and 8. The cut out 71 which has vertical sidewalls is sized to be a little larger than the width of the bar 67 so that the bar 67 will fit through the cut out 71.

To assemble the cartridge into the tree, the cartridge is inserted into the bottom of the trunk 32 with the lugs 28 of the cartridge sliding into the slots 49 defined between the ribs 46 in the adaptor 36. The cartridge is pushed upwardly as far as it will go in the trunk so that the lugs 28 are pushed against the shoulder 38. When the cartridge has been moved upwardly to this extent within the trunk 32, the dove-tailed groove 26 within the cap 18 will be fully exposed by the cutout 71; that is the bottom of the dove-tailed groove 26 will be above the bottom surface of the cutout 71. This arrangement allows the dove-tailed bar 67 formed on the adaptor 53 on the bottom of the stem 33 to be inserted into the groove 26 through the cutout 71, thus completing the assembly of the cartridge in the peppermill tree. By virtue of the dove-tailed bar 67 being in the dove-tailed groove 26, when the stem 33 is turned on its axis relative to the trunk 32, the cap 18, the axle 20, and the grinding element 22 will be rotated within the body 16 of the cartridge and thus, effect grinding of the peppercorns and dispensing of the ground pepper from the cartridge. As the cap and grinding element are turned, the lugs 28 in the slots 49 prevent the cartridge body from turning with the cap and grinding element.

In the normal operating position, the cartridge 14 will be positioned so that the bottom of the cartridge is aligned with the bottom of the trunk 32 and the downwardly facing radial surface of the radial section 59 of the adaptor 53 will be in engagement with the top planar surface of the trunk 35. The normal tendency to exert downward pressure on the stem 33 during the grinding operation will tend to maintain the cartridge in this position. In this operating position, the slot 26 in the cap 18 of the cartridge will be below the cutout 71 so that the stem 33 cannot be easily removed from the cartridge without prior knowledge of how to effect this removal and the cartridge cannot be easily removed from the tree. This structure is to hinder theft of the cartridge when the peppermill tree is being used in a restaurant or in other similar applications.

The above described wooden peppermill tree and cartridge combination of the present invention operates mechanically similar to the peppermill tree of the above mentioned copending application Ser. No. 088,254. The peppermill tree of this invention differs from that of the copending application in that the peppermill tree of this invention is largely made of wood facilitating of the manufacture of different sizes and shapes of the peppermill tree as well as improving the design appearance of the appearance of the peppermill tree. The plastic adapters in combination with the wooden components of the peppermill tree make it possible to manufacture the wooden components of the peppermill tree with simple wood forming steps reducing the incidence of splitting and cracking of the wooden components and thus reducing the amount of waste in the manufacturing process.

The above described embodiment is a peppermill and the invention has its widest application in this form. It will be apparent that the invention can also be used to grind other foods such as salt, hard cheese, and nuts.

As indicated above, the invention is primarily for the purpose of facilitating making the peppermill tree largely out of wood. However, it will be appreciated that the concept of using adapters in combination with the trunk body 35 or the stem handle portion 51 is also applicable to having the trunk body 35 or handle portion 51 made of other materials. For example, to reduce the cost of the peppermill tree or provide a design variation in the peppermill tree, it may be desirable to make the trunk body 35 or the stem portion 51 out of a paperboard product or other material which presents problems in forming the blind slots 49 in the trunk 32 or the bar 67 on the stem 33 or which is not strong enough to coact with the lugs 28 or the groove 26 of the peppermill cartridge. The use of the adapters in the trunk and the stem permits the material from which the peppermill tree is made to be selected from a wide range of different materials.

The above-description is of a preferred embodiment of the invention and modification may be made thereto without departing from the spirit and scope of the invention which is defined in the appended claims.

What is claimed is:

1. A combination of a disposable food grinding cartridge and a casing removably housing said cartridge, said cartridge comprising a container containing food to be ground and a grinding mechanism to grind the food contained in said container and dispense the ground food from said container, said grinding mechanism including a rotatable grinding member which effects grinding of food contained in said container when said grinding member is rotated relative to said container, said casing comprising a tubular section surrounding said cartridge and a handle section rotatable with respect to said tubular section, said cartridge and said handle section having means to connect said handle section to said rotatable member to rotate said rotatable member with said handle relative to said tubular section, said tubular section comprising a tubular member made of a first material and an adaptor made of a different material mounted in one end of said tubular member, said adaptor defining slots in one end of said tubular section, said container having lugs disposed in said slots to prevent rotation of said container relative to said tubular section.

2. A combination as recited in claim 1, wherein said adaptor is made of plastic and said tubular member is made out of wood.

3. A combination as recited in claim 1, wherein said handle section comprises a major portion and a second adaptor on said major portion made of a different material than said major portion, said second adaptor and said rotatable member having means to couple said rotatable member for rotation with said handle section relative to said tubular section.

4. A combination as recited in claim 3, wherein said first mentioned adapter and said second adaptor are made of plastic and said tubular member and said major portion are made out of wood.

5. A combination as recited in claim 3, wherein said coupling means comprises (1) a cap on said cartridge connected to said rotatable member for rotation therewith, (2) said second adaptor, (3) means defining a recess in one of said cap and said second adaptor and (4) means defining a projection on the other one of said cap and said adaptor received in said recess.

6. A combination as recited in claim 5, wherein said recess comprises a groove and said projection comprises a bar which can move in said groove only by sliding longitudinally in said groove.

7. A combination as recited in claim 6, wherein said groove and said bar are dove-tailed in shape.

8. A combination comprising a disposable food grinding cartridge and a casing removably housing said cartridge, said cartridge comprising a container containing food to be ground and a grinding mechanism to grind the food contained in said container and to dispense the ground food from said container, said grinding mechanism comprising a rotatable member which effects grinding of said food by rotating relative to said container, said casing comprising a tubular section surrounding said cartridge and a handle section rotatable with respect to said tubular section, said handle section having a major portion and an adaptor mounted on said major portion made of a different material than said major portion, said adaptor and said rotatable member having means to couple said rotatable member to said handle section for rotation therewith, said container and said tubular section having means to prevent rotation of said container relative to said tubular section.

9. A combination as recited in claim 8, wherein said adaptor is made of plastic and said major portion is made of wood.

10. A combination as recited in claim 8, wherein said coupling means comprises said adaptor, a cap connected for rotation with said rotatable member, means defining a recess in one of said cap and said adaptor, and a projection formed on the other of said cap and adaptor fitting within said recess.

11. A combination as recited in claim 10, wherein said recess comprises a groove and said projection comprises a bar, said groove and said bar being shaped so that said bar is movable in said groove only by sliding longitudinally in said groove.

12. A combination as recited in claim 11, wherein said groove and said bar are dove-tailed in shape.

* * * * *